United States Patent Office 3,481,696
Patented Dec. 2, 1969

3,481,696
THE COMPOUND, $NH_3CB_{10}H_{12}$, ITS DERIVATIVES, AND THEIR METHODS OF PREPARATION
Walter H. Knoth, Jr., Mendenhall, Pa., assignor to E. I. du Pont de Nemours and Company, Wilmington, Del., a corporation of Delaware
No Drawing. Filed June 11, 1965, Ser. No. 463,336
Int. Cl. C07f 5/02; C01b 35/00
U.S. Cl. 23—59
18 Claims

ABSTRACT OF THE DISCLOSURE

Compounds, such as $MNH_2CB_{10}H_{12}$ and $$QCH{=}N(M)CB_{10}H_{12}$$

wherein M is hydrogen or one equivalent of an alkali metal cation, an alkaline-earth metal cation, and an ammonium-type radical; and Q is an aliphatically saturated hydrocarbon group of up to 17 carbon atoms, are prepared by reacting, for example, a salt of $B_{10}H_{13}CN^{2-}$ with a dilute acid and subsequently reacting the product $NH_3CB_{10}H_{12}$, with a base or an aldehyde. These compounds may be used as reducing agents.

---

This invention relates to novel boron-containing compounds and processes for their preparation.

Reports of carborane compounds, i.e., boron cage or near-cage compounds containing carbon as a part of the skeletal structure having stimulated interest in the preparation of polyhedral boron compounds containing heteroatoms as a part of the skeletal structure. It is an object of this invention to provide novel aminocarboranes containing one hetero carbon atom. Another object is to provide processes for their preparation. These and other objects will become apparent hereinafter.

The novel compounds of this invention are salts, including an inner salt, containing the C-aminododecahydromonocarbaundecaborate(1-) anion. The novel compounds are represented by the following formulas:

(1) $MNH_2CB_{10}H_{12}$ in which M is hydrogen or one equivalent of a cation defined further below, and (2) $QCH{=}N(M)CB_{10}H_{12}$ in which M is defined as above and Q is an aliphatically saturated hydrocarbon group of up to 17 carbon atoms. For convenience and because of availability, Q is preferably of up to 11 carbon atoms. By "aliphatically saturated hydrocarbon group" is meant a hydrocarbon group which does not contain any ethylenic or acetylenic unsaturation, i.e., the only unsaturation present is aromatic. Thus the term Q embraces alkyl, cycloalkyl, aryl, alkaryl and aralkyl groups.

The nucleus of the novel compounds is believed to be a distorted icosahedral fragment consisting of one carbon atom, ten boron atoms and two bridging hydrogen atoms. The amino nitrogen is bonded to the carbon atom of the $CB_{10}H_{12}$ nucleus.

The compound wherein M is hydrogen, i.e.

(3) $NH_3CB_{10}H_{12}$ is prepared by treating the anion (4) $B_{10}H_{13}CN^{2-}$ with water, either alone or, preferably, in an acidic medium. An acidic medium is preferred because the acid present greatly increases the rate of reaction. The amino group is strongly basic and the compound is ordinarily isolated from acid, neutral, or weakly basic media in the N-protonated, inner-salt form, $NH_3CB_{10}H_{12}$. However, in the presence of a strong base, e.g. an alkali-metal hydroxide or a quaternary ammonium hydroxide, one proton can be removed to form salts containing the $NH_2CB_{10}H_{12}^-$ anion.

The $B_{10}H_{13}CN^{2-}$ anion is used in its salt form, and any salt can be employed. However, for convenience and availability, the alkali-metal or alkaline-earth-metal salts are preferred. These reactions can be prepared as described in J. Inorg. Nucl. Chem., 20, 66 (1961). For example, the sodium salt can be prepared in situ by mixing decaborane with sodium cyanide in the presence of water.

When water alone, i.e., no acidic medium, is used in the process of the invention a temperature between about 75° C. and the decomposition temperature of the product is employed. A preferred temperature, because of convenience, is the reflux temperature of the reaction mixture at ambient pressure, i.e., about 100° C. Conversions to the desired product are too small to be of practical interest in less than about 12 hours. The preferred time is about one to five days. Pressure is not critical.

The preferred medium, the acidic medium, can be supplied by an acidic ion-exchange resin, or by an aqueous solution of a non-oxidizing acid.

Such non-oxidizing acids include hydrochloric, hydrobromic, hydroiodic or dilute nitric or dilute sulfuric. By dilute is meant 2 molar or less. Preferably the aqueous acid solution is below 2 molar, and most preferably will be between 0.01 and 1.5 molar; for above about 2 molar, a significant amount of polyhedral boron compound of the formula $NH_3CB_9H_{11}$ forms along with the $NH_3CB_{10}H_{12}$. The reaction takes place simply by mixing the $B_{10}H_{13}CN^{2-}$ with the acidic solution. The compounds of Formula 1 can be isolated from the aqueous acid solution by adding a precipitating agent. For example, upon the addition of dioxane, the dioxanate, $$NH_3CB_{10}H_{12}$$

dioxane precipitates. In addition, a soluble salt or hydroxide having a cation which will precipitate with the $NH_2CB_{10}H_{12}^{1-}$ anion can be added.

Preferably, however, the acidic medium is an ion-exchange resin such as "Amberlite" IR 120(H). In this instance, an aqueous solution of the $B_{10}H_{13}CN^{2-}$ anion is simply passed through a column containing the resin. $NH_3CB_{10}H_{12}$ is obtained simply by evaporating the water effluent. It can also be obtained as the dioxanate as seen above. To obtain compounds of Formula 1 containing the cation M, the water effluent can be carefully neutralized with the appropriate base and the effluent evaporated, or a salt or base having a cation which will precipitate with the $NH_2CB_{10}H_{12}^{1-}$ anion added.

Temperature and pressure are not critical in either method. Room temperature and atmospheric pressure are preferred for convenience, although sub or super-atmospheric pressures may be employed, as may be other temperatures, e.g. 0–100° C.

The bases which may be added in the above process are those containing cations (M) selected from alkali metals, alkaline-earth metals, or cations of the formula $VV'_3N^+$, $V_4P^+$, $V_3S^+$, $V_4As^+$, or $V_4Sb^+$. V is defined as an aliphatically saturated hydrocarbon group, and V' as an aliphatically saturated hydrocarbon group bonded to N through aliphatic carbon. Preferably V and V' each contain up to 18 carbon atoms, and most preferably up to 12 carbons. Any two V or V' groups (or a V and V' in $VV'_3N^+$) can also be joined (bonded) directly to each other or through an oxygen hetero atom, to form a divalent aliphatically saturated hydrocarbon group or oxygen-interrupted (mono-oxa) hydrocarbon group of up to 18 carbon atoms and preferably of up to 12 carbons.

Most preferably such a divalent radical is an alkylene radical of 4–8 carbons. "Aliphatically saturated hydrocarbon" is defined as previously.

Examples of these cations include benzyltrimethylammonium, N,N-diethyl-2,5-dimethylpyrrolidinium, dodecyltrimethylammonium, cyclohexyltrimethylammonium, N-methyl - N - octadecylmorpholinium, tetrabenzylphosphonium, ethylpentamethylene-p-tolylphosphonium, benzylhexadecyldimethylphosphonium, isobutylethylmethylisopropylphosphonium, benzyltris(4 - biphenylyl)phosphonium, triphenylsulfonium, methyltetramethylenesulfonium, methyldipentylsulfonium, cyclohexyldimethylsulfonium, tetramethylarsonium, 2-biphenylyltrimethylarsonium, methyltri(p-tolyl)arsonium, tetraphenylstibonium, decyltriphenylstibonium, and the like.

Of the V- and V'-substituted cations above, the ammonium, phosphonium, and sulfonium are preferred because of availability. For the same reason, those containing only lower alkyl substituents (1–8 carbon atoms) are preferred.

The above cations may also be supplied in their salt form, particularly chloride form, if they are not added in the basic form.

To prepare compounds of Formula 2, $NH_3CB_{10}H_{12}$ is treated with an aldehyde of the formula QCHO where Q is as previously defined. The reaction can be carried out at temperatures ranging from the freezing point of the reaction mixture to about 50° C. For convenience, ordinary temperatures and pressures are preferred, e.g., temperatures of 15–30° C. Usually at least one mole of aldehyde per mole of $NH_3CB_{10}H_{12}$, as dictated by the stoichiometry of the reaction, is employed. However, to insure complete conversion of the carborane, an excess of aldehyde, about 10–400 percent by weight (1.1–5.0 moles of aldehyde per mole of carborane) is conveniently employed. At room temperatures, the reaction is usually complete in an hour or less. The course of the reaction can be followed by acidifying an aliquot portion of the reaction mixture and examining its infrared absorption spectrum of the solid thus precipitated, following suitable purification.

Aldehydes that can be employed and the corresponding Q group obtained are exemplified as follows: Acetaldehyde produces the methyl Q group, isobutyraldehyde produces an isopropyl group; pivalaldehyde produces tert-butyl; cyclopentanecarboxaldehyde produces cyclopentyl; 2-ethylhexanal produces 1-ethylpentyl; the undecyl group is obtained from dodecanal; the heptadecyl group from octadecanal; the p-tolyl group from p-tolualdehyde; the phenethyl group from β-phenylpropionaldehyde; 2-anthryl from 2-anthraldehyde; 2,4,6-triethylphenyl from 2,4,6-triethylbenzaldehyde; 3-pyrenyl from 3-pyrenecarboxaldehyde; and so on.

Compounds of Formula 2 containing the cation M are obtained from $QCH=NHCB_{10}H_{12}$ in the same way that the cationic compounds of Formula 1 are obtained.

The compounds of the invention are white, crystalline, high-melting solids. The compound $NH_3CB_{10}H_{12}$ can be hydrocarbylated simply by adding a hydrocarbylating reagent to a basic solution of the boron compound. Any hydrocarbylating reagent that can be used to hydrocarbylate organic amines may be employed, e.g., reagents of the formula $R_gZ$ where R is alkyl, cycloalkyl, aralkyl, having a hydrogen on the carbon attached to the Z group, or o- or p-nitro-substituted aryl, and Z is a group of valence g and can be chloride, bromide, iodide, sulfate, or a $C_1$–$C_7$ hydrocarbonsulfonate free of aliphatic unsaturation. Thus the reagent can be dimethyl sulfate, methyl iodide, benzyl chloride, methyl-p-toluenesulfonate, ethyl methanesulfonate, and the like. The products formed will have the formula $RRRNCB_{10}H_{12}$ where each R is defined as above and up to two of the R's can be hydrogen.

The products and process of this invention are illustrated in further detail in the following examples.

EXAMPLE 1

An aqueous solution of $Cs_2B_{10}H_{13}CN$ was passed through a column packed with a commercial, sulfonic-acid-type, cation-exchange resin ["Amberlite" IR 120 (H)]. The effluent solution was evaporated under vacuum below 35° until a damp solid was formed. This was stirred with a small amount of water, and the mixture was filtered to remove insoluble solid. The filtrate was extracted three times with ethyl ether. The combined extracts were dried over calcium chloride, filtered, and evaporated to leave crystalline $NH_3CB_{10}H_{12}$ containing some ether of solvation. The ether was removed by dissolving the product in water and evaporating the solution on a steam bath. The final product was dried at 80° in vacuo. $NH_3CB_{10}H_{12}$ darkens at about 280° but does not melt to 400°.

*Analysis.*—Calcd. for $CH_{15}B_{10}N$: B, 72.5; C, 8.0; H, 10.1; N, 9.4. Found: B, 73.0; C, 8.0; H, 10.1; N, 9.4.

The proton magnetic resonance spectrum of $$NH_3CB_{10}H_{12}$$

confirms that it does not contain hydrogen bonded to carbon. The infrared spectrum of $NH_3CB_{10}H_{12}$ in a potassium bromide wafer contains characterizing absorptions at the following wave lengths (in microns): 3.1 (m.), 3.15 (m.), 3.20 (m.), 3.90 (m.), 3.95 (s.), 6.35 (m.), 675 (s.), 8.58 (w.), 8.95 (w.), 9.80 (m.), 10.05 (m.), 10.4 (2), 10.65–10.85 (w.), 11.25 (w.), 11.60 (w.), 11.80 (w.), 12.33 (w.), 13.1 (w.), 13.3 (w.), 14.0–14.1 (w.), 14.35 (w.), and 14.8 (w.). The (m.), (s.), and (w.) indicate respectively medium, strong, and weak absorptions.

EXAMPLE 2

A mixture of decarborane (12 gm., 9.8 mmoles), sodium cyanide (0.31 mole), and water (300 ml.) was stirred until the decarborane had essentially all dissolved. The solution of $Na_2B_{10}H_{13}CN$ thus formed was filtered and the filtrate was passed through an ion-exchange column filled with "Amberlite" IR 120(H) resin in excess of that needed to remove all of the sodium cation. The effluent solution was evaporated to dryness on a steam bath. The residue was stirred in 150 ml. of ether and the mixture was filtered. This filtrate was evaporated to dryness; the residue was dissolved in a small amount of water and evaporated to dryness on a steam bath to obtain 8.3 g. (57% yield) of $NH_3CB_{10}H_{12}$.

Dioxane can also be added to precipitate the $$NH_3CB_{10}H_{12}$$

directly from the effluent solution as a dioxanate. For example, dioxane (5 ml.) was added to a solution of $NH_3CB_{10}H_{12}$ (3.9 gm.) in 20 ml. of water. A solid precipitated and after recrystallization from water, 3.2 gm. of $NH_3CB_{10}H_{12} \cdot C_4H_8O_2$ was obtained.

*Analysis.*—Calcd. for $NH_3CB_{10}H_{12} \cdot C_4H_8O_2$: B, 45.5; C, 25.4; H, 9.7; N, 5.9. Found: B, 46.2; C, 25.3; H, 9.7; N, 5.8, 6.1.

EXAMPLE 3

A mixture of decarborane (12 gm.), sodium cyanide (15 gm.), and 300 ml. of water was stirred until the decaborane dissolved. The solution of $Na_2B_{10}H_{13}CN$ thus formed was passed through an ion-exchange column which contained "Amberlite" IR 120(H) resin in excess of that needed to remove the sodium cations from the solution. The effluent was basified with a solution of 20 g. of sodium hydroxide in 100 ml. of water. Tetramethylammonium chloride (10 g.) was added and the resulting precipitate was filtered and dried to obtain 11.6 g. (64%) of $$(CH_3)_4N^+NH_2CB_{10}H_{12}^-$$

The analytical sample was recrystallized from water and then from 2% tetramethylammonium hydroxide solution.

*Analysis.*—Calcd. for $C_5H_{26}B_{10}N_2$: B, 48.6; C, 27.0; H, 11.7; N, 12.6. Found: B, 48.6; C, 25.6; H, 11.6; N, 12.4.

EXAMPLE 4

A mixture of $Cs_2B_{10}H_{13}CN$ (16.3 g., 37 mmoles), 12 M hydrochloric acid (65 ml.), and 130 ml. of water was stirred until a clear solution was formed. Hydrogen (62 mmoles) was evolved. The addition of tetramethylammonium hydroxide pentahydrate precipitated a solid which was recrystallized from water to obtain 4.6 g. of a solid containing $(CH_3)_4N^+NH_2CB_{10}H_{12}^-$. This solid was dissolved in hot water and passed through an ion-exchange column containing "Amberlite" IR 120(H). Evaporation of the effluent gave a solid which by infrared analysis was determined to contain $NH_3CB_{10}H_{12}$. Reaction of an aqueous solution of this solid with dimethyl sulfate and excess aqueous sodium hydroxide precipitated a solid. This was shown, by infrared and proton magnetic resonance analysis, to contain $(CH_3)_3NCB_{10}H_{12}$.

The solids obtained above were also shown by infrared or proton magnetic resonance analysis to contain, respectively, $(CN_3)_4N^+NH_2CB_9H_{11}^-$, $NH_3CB_9H_{11}$, and $(CH_3)_3NCB_9H_{11}$.

EXAMPLE 5

A mixture of $Cs_2B_{10}H_{13}CN$ (30.7 g.) and 12 M hydrochloric acid (100 ml.) was stirred until essentially all the solid dissolved. Vigorous bubbling ensued during this period. The solution was filtered and dioxane (50 ml.) was added to the filtrate to precipitate 10 g. of a solid containing $NH_3CB_{10}H_{12}$·dioxane. Prolonged heating of part of this mixture at 135° in vacuo resulted in removal of the dioxane. Reaction of this product with aqueous sodium hydroxide and dimethyl sulfate precipitated a solid which was shown by proton magnetic resonance analysis to contain $(CH_3)_3NCB_{10}H_{12}$.

$NH_3CB_9H_{11}$·dioxane and $(CH_3)_3NCB_9H_{11}$ were also determined to be present in each respective solid.

EXAMPLE 6

A solution of $Cs_2B_{10}H_{13}CN$ (20 g., 48.5 mmoles) in warm water was passed through an ion-exchange column filled with "Amberlite" IR 120(H) resin. The effluent solution of $NH_3CB_{10}H_{12}$ was basified with 10% aqueous sodium hydroxide solution. Two 10-ml. portions of methyl sulfate were added with stirring and addition of aqueous sodium hydroxide as needed to maintain basicity.

$(CH_3)_3NCB_{10}H_{12}$ (8.3 g., 90%) precipitated and was recrystallized from aqueous acetonitrile, M.P. 345–350°.

*Analysis.*—Calcd. for $C_4H_{21}B_{10}N$: B, 56.5; C, 25.1; H, 11.0; N, 7.3. Found: B, 56.1; C, 25.8; H, 11.0; N, 7.5.

The infrared spectrum of $(CH_3)_3NCB_{10}H_{12}$ in a Nujol mull contains characterizing absorptions at the following wave lengths (in mircons): 3.95 (s.), 5.0 (w.), 8.05 (w.), 8.85 (m.), 9.75 (m.), 10.1 (m.), 10.3 (m.), 10.68 (m.s.), 10.85 (m.s.), 11.2 (m.), 11.55 (w.), 11.75 (m.), 12.3 (m.), 12.75 (m.), 13.0 (w.), and 14.0 (m.).

EXAMPLE 7

A solution of $NH_3CB_{10}H_{12}$ in water was prepared. Benzyl bromide and aqueous sodium hydroxide were added and the mixture was boiled briefly with vigorous stirring and then cooled. A small amount of solid formed and was separated. The mixture was filtered. The addition of hydrochloric acid to the filtrate precipitated $C_6H_5CH_2NH_2CB_{10}H_{12}$ which was removed and recrystallized from water. Infrared, X-ray, and carbon-hydrogen analyses identified the product.

EXAMPLE 8

Benzaldehyde (7.4 g.) was added to a solution of 5 g. of $NH_3CB_{10}H_{12}$ in 75 ml. of aqueous 5% sodium hydroxide. The mixture was stirred for 20 minutes at room temperature. The basic solution of $Na(C_6H_5CH=NCB_{10}H_{12})$ thus obtained was acidified with hydrochloric acid. The solid that precipitated was separated by filtration, washed with water, and dried, to give 11.2 g. of $C_6H_5CH=NHCB_{10}H_{12}$ After recrystallization from benzene-cyclohexane, and then from aqueous alcohol, the product melted at 184–185° C.

*Analysis.*—Calcd. for $C_8H_{19}B_{10}N$: C, 40.0; H, 8.0; B, 45.5; N, 5.9. Found: C, 41.0; H, 8.2; B, 45.8; N, 6.4.

The sodium salt mentioned above can be obtained in the pure state by dissolving $C_6H_5CH=NHCB_{10}H_{12}$ in an equivalent amount of dilute aqueous sodium hydroxide and evaporating to dryness at room temperature and reduced pressure.

EXAMPLE 9

A mixture of $Cs_2B_{10}H_{13}CN$ (8.0 g.) and 80 ml. of water was refluxed for 3 days and cooled. The mixture was a solution at the boiling point. On cooling, unreacted $Cs_2B_{10}H_{13}CN$ crystallized and was separated by filtration. The recovery of this compound was 20%. The filtrate, which was a solution containing $CsNH_2CB_{10}H_{12}$, was stirred with 20 ml. of aqueous 10% sodium hydroxide and 2 ml. of dimethyl sulfate, whereupon $(CH_3)_3NCB_{10}H_{12}$ precipitated as a solid and was separated by filtration. The yield was 1.1 g. (37%). The product was identified by comparison of its infrared absorption spectrum with that of an authentic sample.

When a small aliquot sample of the reaction mixture was worked up as described above after 4.5 hours at reflux temperature, only a very small amount of

$(CH_3)_3NCB_{10}H_{12}$ was isolated.

By the procedures of Examples 3 and 4, any of the cations previously discussed can be used in place of the tetramethylammonium cation employed therein to obtain other salts by procedures previously described. Similarly, any of the aldehydes previously discussed can be employed in place of the benzaldehyde of Example 8.

In Examples 1–3, the acid reagent was an acidic cation-exchange resin and little, if any, hydrogen evolution was observed. In adition, $NH_3CB_{10}H_{12}$ was the only product formed in significant amounts. However, in Examples 4 and 5, hydrogen was evolved and significant amounts of products having an amino-$CB_9H_{11}$ structure were formed. Thus, the amount of hydrogen evolved provides an indication of the amount of $NH_3CB_9H_{11}$ that is produced. To determnie the acid concentration above which the formation of the $NH_3CB_9H_{11}$ structures become appreciable, $Cs_2B_{10}H_{13}CN$ was treated with varying concentrations of hydrochloric acid and the amounts of hydrogen evolved were measured. The experiments are summarized in the following table:

| Gms. $Cs_2B_{10}H_{13}CN$ | Ml. HCl | Molarity of HCl | Ml. $H_2$ | Moles $H_2$ Per Mole $Cs_2B_{10}H_{13}CN$ |
|---|---|---|---|---|
| 0.413 | 31 | 0.39 | <1 | Insignificant |
| 0.413 | 35 | 1.7 | 4 | Insignificant |
| 0.200 | 15 | 4.0 | 23 | 2 |
| 0.200 | 10 | 6.0 | 25 | 2 |
| 0.413 | 15 | 12.0 | 95 | 4 |

Thus hydrogen evolution, and therefore, correspondingly, formation of amino-$CB_9H_{11}$ compounds, becomes appreciable at acid concentrations of about 2 molar and above.

The compounds of this invention are useful as reducing agents, e.g. they reduce silver nitrate to metallic silver and palladium chloride to metallic palladium. They are therefore useful in the manufacture of printed circuits in electrical and electronic equipment. They are also useful in the preparation of electrical resistors. For example, a cotton string can be impregnated with a nearly saturated solution of a compound of the invention, e.g. $NH_3CB_{10}H_{12}$, in a volatile solvent. The string is then removed from the solution, dried, and burned to yield a coherent ash which in size and shape resembles the original string. This residual ash is of sufficient coherence to permit embedding in paraffin and is a useful electrical resistor. Resistors of 1,200,000 ohms/mm. have been prepared in this manner.

The embodiments of the invention in which an exclusive property or privilege is claimed are defined as follows:

1. A boron-containing compound selected from the group consisting of $MNH_2CB_{10}H_{12}$ and $$QCH=N(M)CB_{10}H_{12}$$

wherein

M is selected from the class consisting of hydrogen and one equivalent of a cation, said cation being selected from the group consisting of alkali metals, alkaline-earth metals, $VV'_3N^+$, $V_4P^+$, $V_3S^+$, $V_4As^+$, and $V_4Sb^+$ wherein V is an aliphatically saturated hydrocarbon group of up to 18 carbon atoms, V' is an aliphatically saturated hydrocarbon group of up to 18 carbon atoms that is bonded to the N through an aliphatic carbon, or wherein any two V and V' groups are joined to form a divalent group of up to 18 carbon atoms selected from the class consisting of aliphatically saturated hydrocarbon and aliphatically saturated mono-oxahydrocarbon; and Q is an aliphatically saturated hydrocarbon group of up to 17 carbon atoms.

2. A compound of the formula $NH_3CB_{10}H_{12}$.

3. A solvate of $NH_3CB_{10}H_{12}$ selected from the group consisting of $NH_3CB_{10}H_{12}$ dioxane and $NH_3CB_{10}H_{12}$ ethyl ether.

4. A compound of the formula $MNH_2CB_{10}H_{12}$ wherein M is alkali metal.

5. A compound of the formula $(VV'_3N)NH_2CB_{10}H_{12}$ wherein V is an aliphatically saturated hydrocarbon group of up to 18 carbon atoms, V' is an aliphatically satuarted hydrocarbon group of up to 18 carbon atoms that is bonded to the N through an aliphatic carbon, and wherein V and one V' taken together are a divalent group of up to 18 carbon atoms selected from the class consisting of aliphatically saturated hydrocarbon and aliphatically saturated mono-oxahydrocarbon.

6. A compound of the formula $$[(CH_3)_4N][NH_2CB_{10}H_{12}]$$

7. A compound of the formula $QCH=NHCB_{10}H_{12}$ wherein Q is an aliphatically saturated hydrocarbon group of up to 17 carbon atoms.

8. A compound of the formula $QCH=(Na)CB_{10}H_{12}$ wherein Q is an aliphatically saturated hydrocarbon group of up to 17 carbon atoms.

9. A compound of the formula $C_6H_5CH=NHCB_{10}H_{12}$.

10. A process for preparing aminocarboranes having one hetero carbon atom which comprises reacting a salt of $B_{10}H_{13}CN^{2-}$ wherein the cation is selected from the class consisting of alkali metal and alkaline-earth metal, with hydrogen ions contained in an acid environment.

11. The process of claim 10 wherein the acid environment is provided by an acidic ion-exchange resin.

12. The process of claim 10 wherein the acid environment is provided by a non-oxidizing acid in aqueous solution.

13. The process of claim 12 wherein the concentration of the acid solution is below 2 molar.

14. A process for preparing aminocarborane salts having one hetero carbon atom which comprises reacting $NH_3CB_{10}H_{12}$ with a strong base.

15. The process of claim 14 wherein the base is a compound of the formula M'OH wherein M' is selected from the class consisting of alkali metals, alkaline-earth metals, $VV'_3N^+$, $V_4P^+$, $V_3S^+$, $V_4As^+$, and $V_4Sb^+$ wherein V is an aliphatically saturated hydrocarbon group of up to 18 carbon atoms, V' is an aliphatically saturated hydrocarbon group of up to 18 carbon atoms that is bonded to the N through an aliphatic carbon, and wherein any two V and V' groups can be joined to form a divalent group of up to 18 carbon atoms selected from the class consisting of aliphatically saturated hydrocarbon and aliphatically saturated mono-oxahydrocarbon.

16. A process for preparing substituted aminocarboranes having one hetero carbon atom which comprises reacting a basic solution of $NH_3CB_{10}H_{12}$ with a hydrocarbylating reagent.

17. A process for preparing compounds of the formula $QCH=NHCB_{10}H_{12}$ which comprises reacting $$NH_3CB_{10}H_{12}$$

with an aldehyde of the formula QCHO wherein Q is an aliphatically saturated hydrocarbon group of up to 17 carbon atoms at a temperature of up to about 50° C.

18. A process for preparing aminocarbonanes having one hetero carbon atom which comprises reacting a salt of $B_{10}H_{13}CN^{2-}$ wherein the cation is selected from the class consisting of alkali metal and alkaline earth metal, with water at a temperature of between about 75° C. and the decomposition temperature of said aminocarboranes for ½ to 5 days.

References Cited

UNITED STATES PATENTS

| 2,992,885 | 7/1961 | Jackson et al. | 23—358 |
| 3,050,361 | 8/1962 | Muetterties | 23—358 |
| 3,118,932 | 1/1964 | Muetterties | 260—606.5 |

OSCAR R. VERTIZ, Primary Examiner

HOKE S. MILLER, Assistant Examiner

U.S. Cl. X.R.

23—358, 359, 362; 260—340.6, 606.5

PO-1050
(5/69)

UNITED STATES PATENT OFFICE
CERTIFICATE OF CORRECTION

Patent No. 3,481,696      Dated December 2, 1969

Inventor(s) Walter H. Knoth, Jr.

It is certified that error appears in the above-identified patent and that said Letters Patent are hereby corrected as shown below:

Column 1, line 30, "having" should be -- have --.

Column 2, the formula following line 37 "$NH_3CB_{10}H_{12}$" should be -- $NH_3CB_{10}H_{12} \cdot dioxane$ --.

Column 2, line 40, delete the word "dioxane".

Column 4, lines 33 and 59, "decarborane" should be -- decaborane --.

Column 6, line 53, "determnie" should be -- determine --.

Column 7, line 33, "$NH_3CB_{10}H_{12}$ dioxane and $NH_3CB_{10}H_{12}$" should be -- $NH_3CB_{10}H_{12} \cdot dioxane$ and $NH_3CB_{10}H_{12}$. -- --

SIGNED AND
SEALED
OCT 13 1970

(SEAL)
Attest:

Edward M. Fletcher, Jr.
Attesting Officer

WILLIAM E. SCHUYLER, J
Commissioner of Patent